United States Patent
Botkin et al.

(10) Patent No.: US 7,653,068 B2
(45) Date of Patent: Jan. 26, 2010

(54) METHOD AND APPARATUS FOR PROVIDING CALL ADMISSION CONTROL IN PACKET NETWORKS

(75) Inventors: Douglas J. Botkin, Aurora, IL (US); Steven L. Makowski, Naperville, IL (US); Marc R. Blumberg, Berwyn, IL (US); Mark G. Bradac, Batavia, IL (US); Edward A. Clark, Sugar Grove, IL (US); Joseph J. Kott, Aurora, IL (US); Donald T. McBride, Naperville, IL (US); Alan H. Matten, Chicago, IL (US); Charles H. Rydholm, Naperville, IL (US); Douglas W. Sturm, Wheaton, IL (US); Jose A. Suarez, Naperville, IL (US); Peng Zhang, Buffalo Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 976 days.

(21) Appl. No.: 10/864,583

(22) Filed: Jun. 9, 2004

(65) Prior Publication Data

US 2006/0007913 A1  Jan. 12, 2006

(51) Int. Cl.
*H04L 12/28* (2006.01)

(52) U.S. Cl. ............... 370/395.2; 370/230; 370/230.1; 370/395.21

(58) Field of Classification Search ................. 370/352, 370/230, 231, 395.2, 395.21
See application file for complete search history.

(56) References Cited

U.S. PATENT DOCUMENTS

| 7,035,289 | B2 * | 4/2006 | Devine et al. ............... 370/493 |
| 2002/0057649 | A1 * | 5/2002 | Kinnunen .................... 370/230 |
| 2004/0165597 | A1 * | 8/2004 | Bicknell et al. ......... 370/395.31 |

* cited by examiner

*Primary Examiner*—Fan Tsang
*Assistant Examiner*—Akelaw A Teshale
(74) *Attorney, Agent, or Firm*—Fay Sharpe, LLP

(57) ABSTRACT

A method and apparatus for providing call admission control in a packet network such as an internet protocol (IP) network are provided. More particularly, a terminating endpoint of a logical connection on a packet network, e.g. an IP network, is provided with the ability to make a decision on whether to accept or reject an incoming call based on quality of service (QoS) indicator based on QoS metrics. These metrics indicate quality of service levels for specific logical connections and are accumulated over specified time periods.

13 Claims, 5 Drawing Sheets

METHOD AND APPARATUS FOR PROVIDING CALL ADMISSION CONTROL IN PACKET NETWORKS

BACKGROUND OF THE INVENTION

This invention relates to a method and apparatus for providing call admission control in a packet network such as an internet protocol (IP) network. More particularly, a terminating endpoint of a logical connection on a packet network, e.g. an IP network, is provided with the ability to make a decision on whether to accept or reject an incoming call based on a quality of service (QoS) indicator that is based on quality of service (QoS) metrics. These metrics indicate quality of service levels for specific logical connections and are accumulated over specified time periods.

While the invention is particularly directed to the art of call admission control on a packet network, and will be thus described with specific reference thereto, it will be appreciated that the invention may have usefulness in other fields and applications. For example, the invention may be used in other environments where it is advantageous to conduct connectivity tests from a terminating endpoint of a connection. Moreover, the invention may be used in environments wherein it is advantageous to conduct testing prior to setting up real-time sensitive packet streams that are delay/loss sensitive, such as streaming video.

By way of background, establishing a voice path in many types of networks is relatively straightforward. As such, testing for voice path assurance is likewise straightforward and reliable. For example, in a time division multiplexed (TDM) network, a static voice path is established using physical (e.g., semi-permanent) connections between endpoints on the network. As such, these physical connections between endpoints can be continuously monitored, during both the idle and busy intervals, to ensure the integrity and performance of the connection and thereby guarantee a certain level of quality. In addition, a provisionable per call voice path assurance (VPA) test (i.e. continuity test) is typically implemented to supplement the continuous monitoring of the physical connection. The originating endpoint of the voice path initiates this continuity test between itself and the terminating endpoint for some or all of the calls carried on the connection.

Such testing could be applied to a packet network, but it has drawbacks that would render such testing impracticable. For example, in packet networks such as IP networks, there are no physical (e.g. semi-permanent) connections between the originating and terminating endpoints. Connections between endpoints in a packet network such as an IP network are logical and dynamic. Sockets are provided at each endpoint to allow for packets to be communicated therebetween; however, no physical or semi-permanent path is maintained. Therefore, continuous monitoring to ensure connectivity is not practically possible. As a consequence, there is some probability that attempts to establish new logical connections across an IP network may fail or may result in low quality logical connections. Of course, neither outcome is desirable.

The present invention contemplates a new and improved call admission control, initiated at the terminating endpoint of a logical connection, that resolves the above-referenced difficulties and others.

SUMMARY OF THE INVENTION

A method and apparatus for providing call admission control (CAC) in a packet network such as an Internet Protocol (IP) network are provided. This technique differs from prior conventional techniques used on TDM networks inasmuch as the technique according to the present invention is packet-based and is initiated by the terminating endpoint of the connection.

In one aspect of the invention, the method comprises sending a logical connection request by the originating endpoint to establish a logical connection, receiving a logical connection request by the terminating endpoint, determining whether current or recent quality of service data is stored for the logical connection, accessing the quality of service data, if the quality of service data is stored, related to the logical connection, determining whether to accept or reject an incoming call on the logical connection based on the accessed quality of service data, acknowledging a logical connection request by the terminating endpoint if it is determined to accept the call and rejecting the logical connection request by the terminating endpoint if it is determined to reject the call.

In another aspect of the invention, the method further comprises initiating a voice path assurance test on the logical connection if no current or recent quality of service data is stored for the logical connection.

In another aspect of the invention, the method comprises monitoring incoming packet streams associated with logical connections into the terminating endpoint, at least some of the logical connections originating from internet protocol address locations at the originating endpoint, establishing logical connections between the terminating endpoint and the originating endpoint, collecting quality of service data on the logical connections, calculating a single aggregate quality of service indicator for the logical connections and maintaining the quality of service indicator for a specified period of time.

In another aspect of the invention, means are provided to implement the methods of the present invention.

In another aspect of the invention, the system comprises an originating endpoint in communication with a packet network, the originating endpoint being operative to send a logical connection request through the packet network to establish a logical connection and a terminating endpoint in communication with the packet network, the terminating endpoint being operative to receive the logical connection request, determine whether quality of service data is stored for the logical connection, accessing the quality of service data, if the quality of service data is stored for the logical connection, determining whether to accept or reject an incoming call on the logical connection based on the accessed quality of service data, acknowledging a logical connection request by the terminating endpoint if it is determined to accept the call, and rejecting a logical connection request by the terminating endpoint if it is determined to reject the call.

In another aspect of the invention, the quality of service data is stored in a data cache.

In another aspect of the invention, the quality of service data is based on quality of service metrics.

In another aspect of the invention, the quality of service data comprises an indicator supporting at least two quality of service levels.

In another aspect of the invention, the quality of service levels comprise at least acceptable and unacceptable.

An advantage of the present invention is that it does not require network-based connectivity testing. The present invention provides for endpoint-based testing.

Another advantage of the present invention is that it provides a packet-based test for a packet network, rather than an analog test.

Another advantage of the present invention is that it may optionally incorporate a voice path assurance test initiated by a terminating endpoint of the logical connection.

Another advantage of the present invention is that it can be run with or without the explicit knowledge at the originating endpoint.

Another advantage of the present invention is that connectivity between an originating endpoint and terminating endpoint in an IP network can be tested before the logical connection is established between the originating and terminating endpoints. Testing according to the present invention ensures that a logical connection can be established between the endpoints and that the connection will support an acceptable QoS level.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
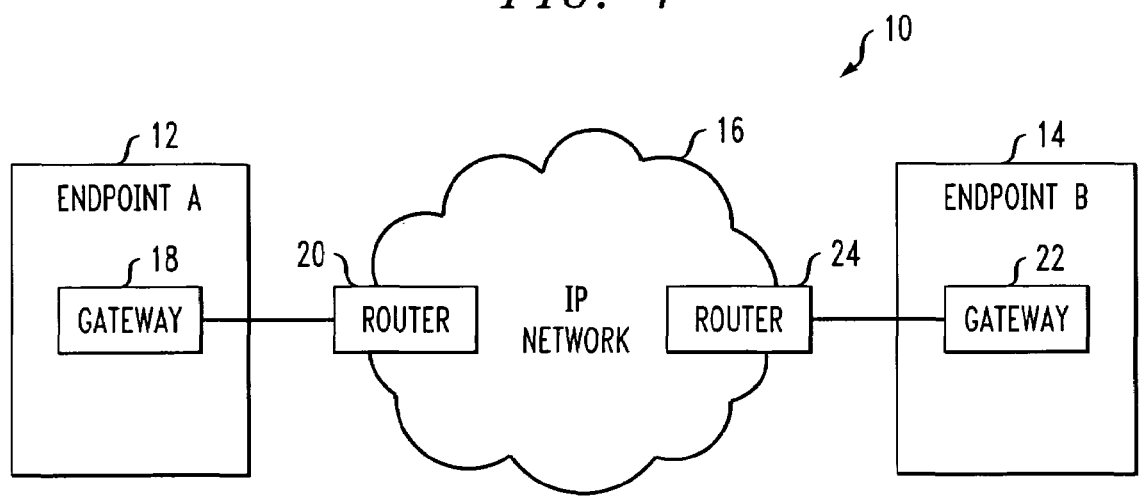
FIG. 1 is an illustration of an exemplary network into which the present invention may be implemented.

Referring now to the drawings wherein the showings are for purposes of illustrating the preferred embodiments of the invention only and not for purposes of limiting same, FIG. 1 provides a view of an overall system 10 into which the present invention may be implemented. As shown, FIG. 1 illustrates two switching endpoints on a packet network such as an IP network, i.e., endpoint A (12) and endpoint B (14). Each endpoint supports bearer connectivity to the IP network through its own gateway device and can originate and/or terminate logical connections. It will be appreciated that a signaling association (although not shown) is established between the endpoints, using either in-band or out-of-band techniques, for the purpose of establishing logical connections between the endpoints. Any appropriate signaling protocol may be used between the endpoints to establish a logical connection between the originating and terminating endpoints, e.g., endpoint A (12) and endpoint B (14), respectively.

As shown, the system 10 comprises the endpoints 12 and 14 and an Internet Protocol (IP) network 16, for establishing a bearer path. The endpoint A (12) is connected to the IP network 16 by way of a gateway 18 and a switch/router 20. As those of skill in the art will understand, there may be a variety of different gateways and switch/routers connecting the endpoint A (12) to the IP network 16. Likewise, the endpoint B (14) is connected to the IP network 16 through a gateway 22 and a switch/router 24. Again, multiple gateways and switch/routers may establish connections between the endpoint B (14) and the IP network 16.

It will be understood by those of skill in the art that configuration of the system 10 may take a variety of forms. For example, the IP network 16 may be replaced by another form of a packet network. The endpoints may also take a variety of forms to accomplish appropriate functionality necessary in the implementation of a communication network. For example, the endpoints may be realized in any network element that originates or terminates an IP packet associated with a call, e.g., a switch, an IP gateway, an IP phone, . . . etc. In this regard, the endpoints may comprise multiple gateways and each gateway may comprise multiple ports (logical channels) that are available for communication functions. In this regard, the endpoints have IP addresses and UDP port numbers associated therewith.

Figure 2:
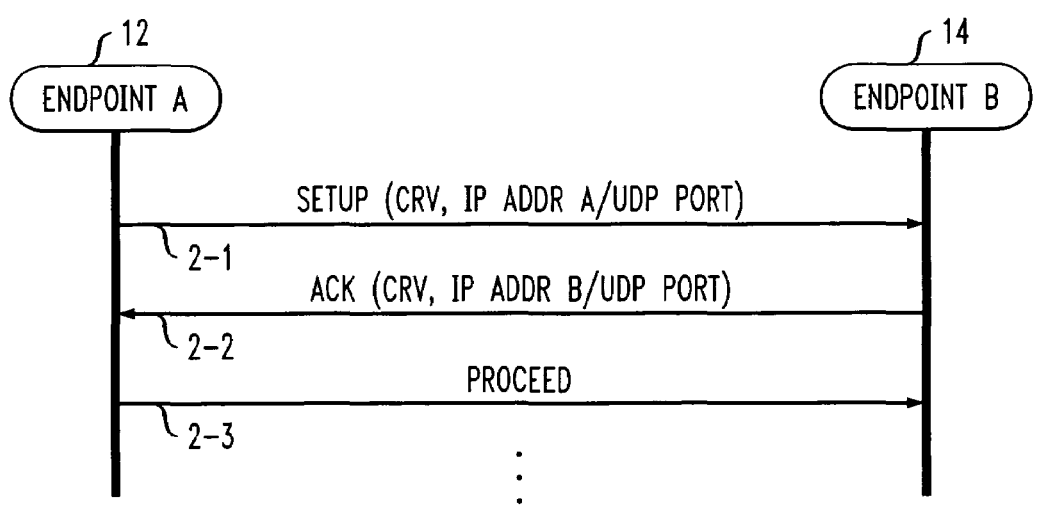
FIG. 2 is a call flow diagram illustrating operation of the network of FIG. 1 into which the present invention may be implemented.

A typical signaling sequence for establishing a logical connection between endpoints (such as those shown in FIG. 1) is shown in FIG. 2. During the connection set-up sequence, each endpoint will identify the logical port (IP address and UDP port number) that it will use to support the bearer connection and will send that information to the other endpoint in a signaling message. After each endpoint has received the logical port information from the other endpoint, the logical connection will be established between the endpoints.

It should be understood that, although FIG. 2 only shows signaling between endpoint A and endpoint B, the signaling actually travels from endpoint A through the IP network (via routers and other switching elements) to endpoint B, and vice-versa. This, of course, is also true for FIGS. 3-4 and 6-7. Signaling and bearer channels may travel through the same IP network or they may travel through different IP networks.

As shown, for example, endpoint A (12) transmits a logical connection request to the network that takes the form of a set-up message destined for endpoint B (14), although it is understood that endpoint A (12) does not have knowledge of the precise destination (e.g., the gateway that will be used by Endpoint B (14)) at this point in the process (at 2-1). It should be appreciated that the set-up message includes a call reference value (CRV) or other form of call identifier, an IP address associated with endpoint A (IP addr A) and a user datagram protocol (UDP) port (UDP port) associated with endpoint A that will support the logical connection. Upon receipt, endpoint B (14) acknowledges the set-up request and transmits an acknowledge message back to endpoint A (at 2-2). Similarly, the acknowledge message includes a call reference value (CRV), an IP address associated with endpoint B (IP addr B) and a UDP port from which the connection will be supported. Receipt of the acknowledgement by endpoint A (12) represents the first opportunity for endpoint A (12) to recognize a specific gateway at endpoint B (14) as the terminating endpoint for the transaction. A proceed message is then sent from endpoint A (12) to endpoint B (14) (at 2-3), and call processing continues as is well known in the art.

It should be appreciated that the message sequence described in connection with FIG. 2 illustrates that which is conducted on the signaling channel between the endpoints, as opposed to the bearer path. Moreover, the sequence described above, as will be appreciated by those skilled in the art, typically includes no verification of the connectivity or performance of the bearer path between the endpoints prior to establishing the logical connection.

Figure 3:
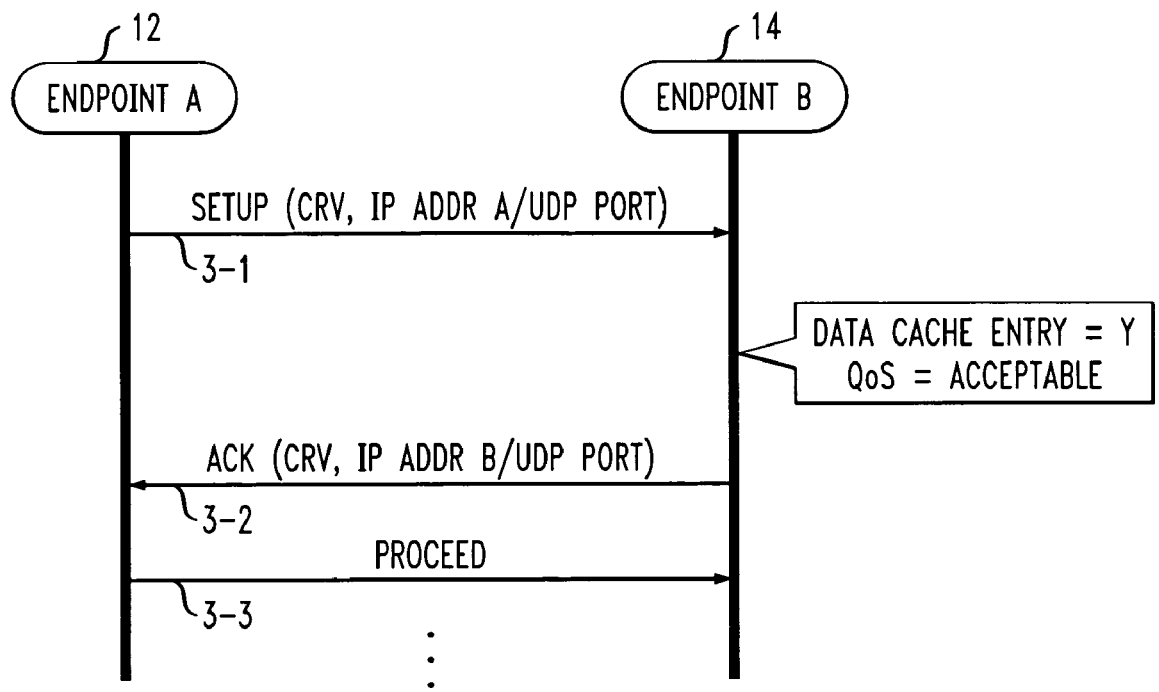
FIG. 3 is a call flow diagram illustrating an embodiment of the present invention.
Figure 4:
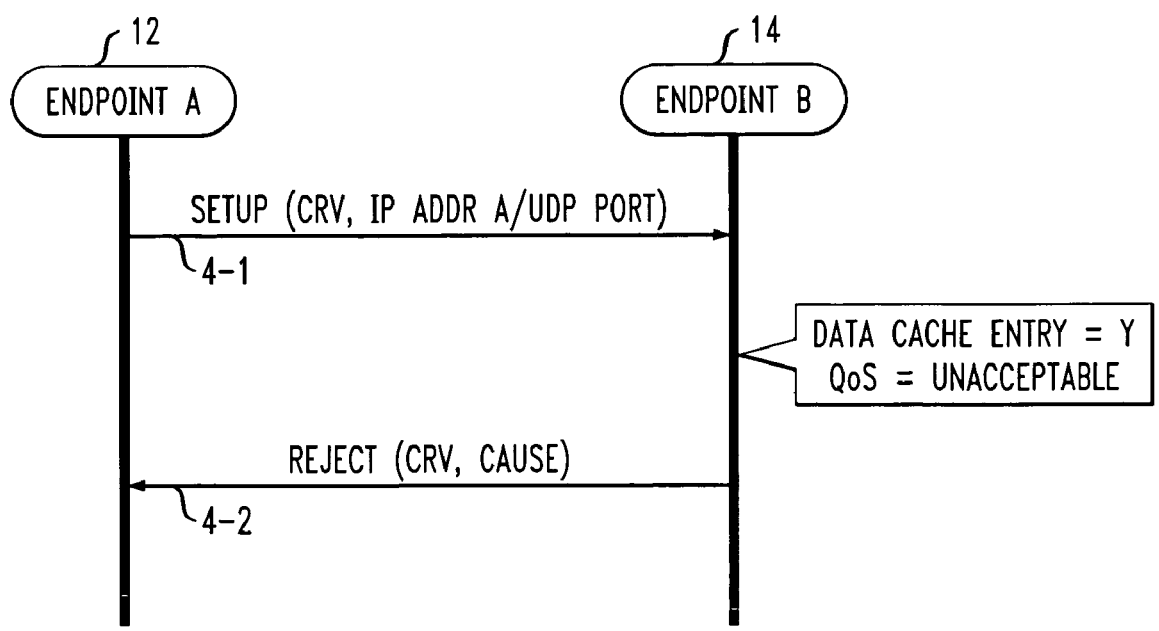
FIG. 4 is a call flow diagram illustrating another embodiment of the present invention.

To overcome these deficiencies, FIGS. 3 and 4 are call flow diagrams illustrating features of a call admission control procedure contemplated by an implementation of the present invention. In this regard, additional features have been added to and included in the call connection sequence to realize improved operation according to the presently described embodiments.

More particularly, packet-based call admission control is initiated by the terminating endpoint 14 for the connection after receiving the logical port information from the originating endpoint 12—but before the terminating endpoint 14 has sent its logical port information to the originating endpoint 12 for the connection. The call admission control, as will be described in further detail below, involves accessing a data cache by the terminating endpoint 14 to determine a Quality of Service (QoS) level for the requested logical connection. Call processing will proceed, or not proceed, based on the result of this access.

It should be understood that the terminating endpoint will build the database, or data cache, having stored therein Quality of Service (QoS) data on the logical connections that are active at any given time. This data cache will preferably be dynamic. Along these lines, it is preferably updated with new QoS data on existing or new logical connections. In addition, data is removed based on a time threshold.

Figure 8:
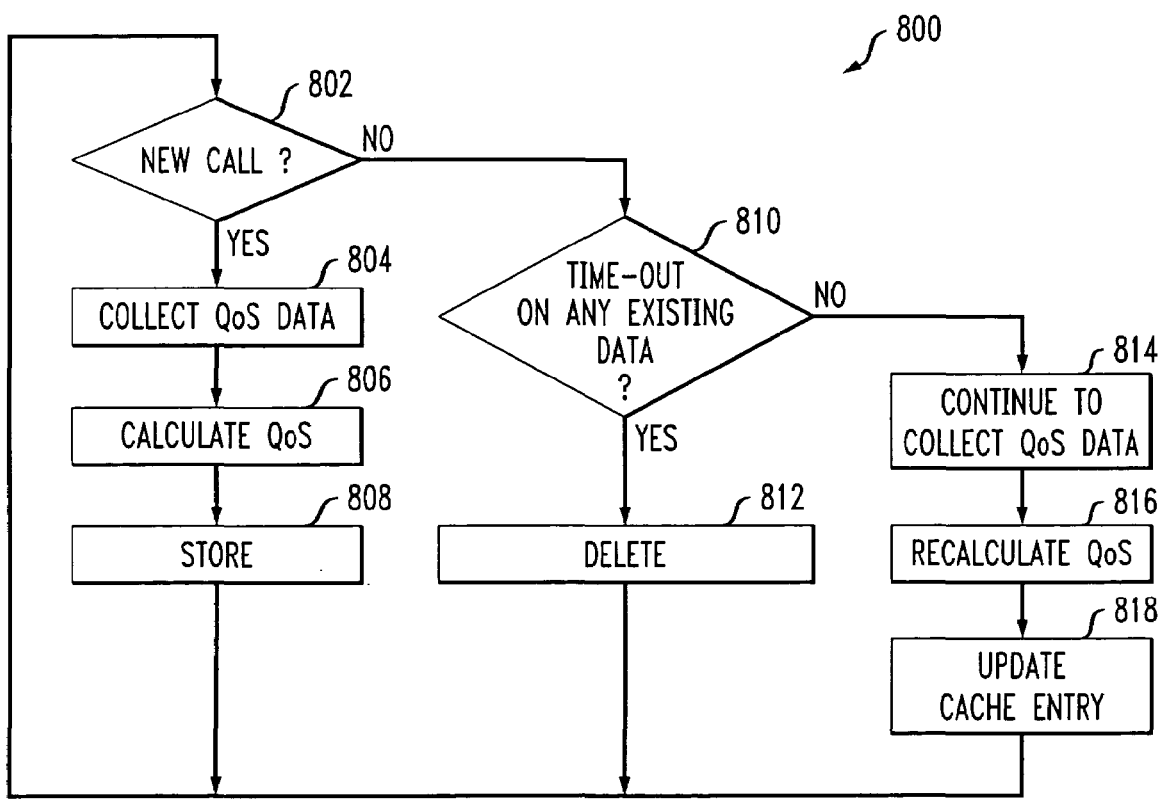
FIG. 8 is a flow chart illustrating a method according to the present invention.

With reference now to FIG. 8, the terminating endpoint 14 builds and maintains a dynamic data cache used to store QoS metrics for all current and recent logical connections to other endpoints on the IP network illustrated by the method 800. This is a dynamic process that may be embodied using a variety of routines. The method 800 shown is exemplary for the purposes of explanation. As shown, QoS metrics are collected for each active call by monitoring the incoming packet stream from the far endpoint IP address that is supporting the call. For example, for new calls or logical connections, QoS metrics are collected (at 802 and 804). Next, QoS metrics for all current/recent calls to/from a far endpoint IP address are used to calculate a single QoS indicator for that far endpoint IP address (at 806). This data is then stored in the data cache (at 808). Similarly, for current active calls or logical connections, QoS metrics are collected on an on-going basis and the QoS indicator is recalculated (at 814 and 816). This data is used to update the data cache (at 818).

The data may be stored in a variety of formats. One example would comprise a lookup table using the far endpoint information (i.e. the IP address or UDP port of the originating endpoint) as an index value. As such, a call admission control QoS indicator is maintained for each active entry in the data cache. The QoS indicator stored in the data cache will support at least two QoS levels—acceptable and unacceptable. Additional states (marginal, etc.) may also be supported based on the needs of the service provider.

It should be understood that the QoS metrics may include one or more of the following: 1) effective packet loss rate; 2) packet delay; 3) jitter, and 4) Coder/Decoder (CODEC) type. These QoS metrics are set by appropriate standards and are well known to those of skill in the field. Also, collecting such data on logical connections between network elements is well known—the terminating endpoint may simply monitor the incoming traffic. Likewise, calculating a single QoS indicator for a logical connection based on multiple calls is a straight-forward process. For example, QoS parameter values may simply be averaged to obtain a single indicator.

As alluded to above, a timer-based thresholding process monitors the QoS metrics for all entries in the data cache to support provisionable measurement intervals. The timer-based thresholding process allows recent calls which have been abandoned to be removed from the data cache. As shown, a time-based thresholding loop (at 810 and 812) illustrates this process. The time allotted for aging will vary depending on the objectives of the network provider, call traffic, . . . etc. Once the data is deleted, the process of calculating and recalculating continues.

With reference back to FIGS. 3 and 4, for every logical connection request to establish a logical connection (e.g. incoming request to set-up a new voice call), the terminating endpoint 14 will receive the IP address and UDP port of the originating endpoint 12 (at 3-1, 4-1). Typically, a SETUP message will include this information, as well as a call reference value (CRV). The terminating endpoint 14 then examines its dynamic data cache to determine if it has stored therein a current or recent entry for voice calls to/from the IP address received in the set-up request.

If the terminating endpoint finds an entry for the IP endpoint in its data cache, the QoS indicator will be checked. With reference to FIG. 3, if the QoS indicator is "acceptable", the terminating endpoint will proceed with the call set-up procedure. In this regard, an acknowledge message acknowledging the logical connection including a call reference value (CRV) and the IP address and the UDP port of the terminating endpoint 14 is transmitted from the terminating endpoint 14 to the originating endpoint 12 (at 3-2). The originating endpoint 12 then sends a proceed indication to the terminating endpoint and call processing proceeds (at 3-3).

Referring now to FIG. 4, if the QoS indicator is "unacceptable", the terminating endpoint will reject the call, or the logical connection request (at 4-2). The reject message will include a call reference value (CRV) as well as data indicating a cause for the rejection.

If the terminating endpoint does not find an entry for the far endpoint (i.e. the originating endpoint 12) in its data cache, the terminating endpoint 14 may take any of a variety of actions. For example, it may continue the call set-up procedure for this call without further testing. In this case, a call flow similar to that of FIG. 3 would ensue.

Figure 6:
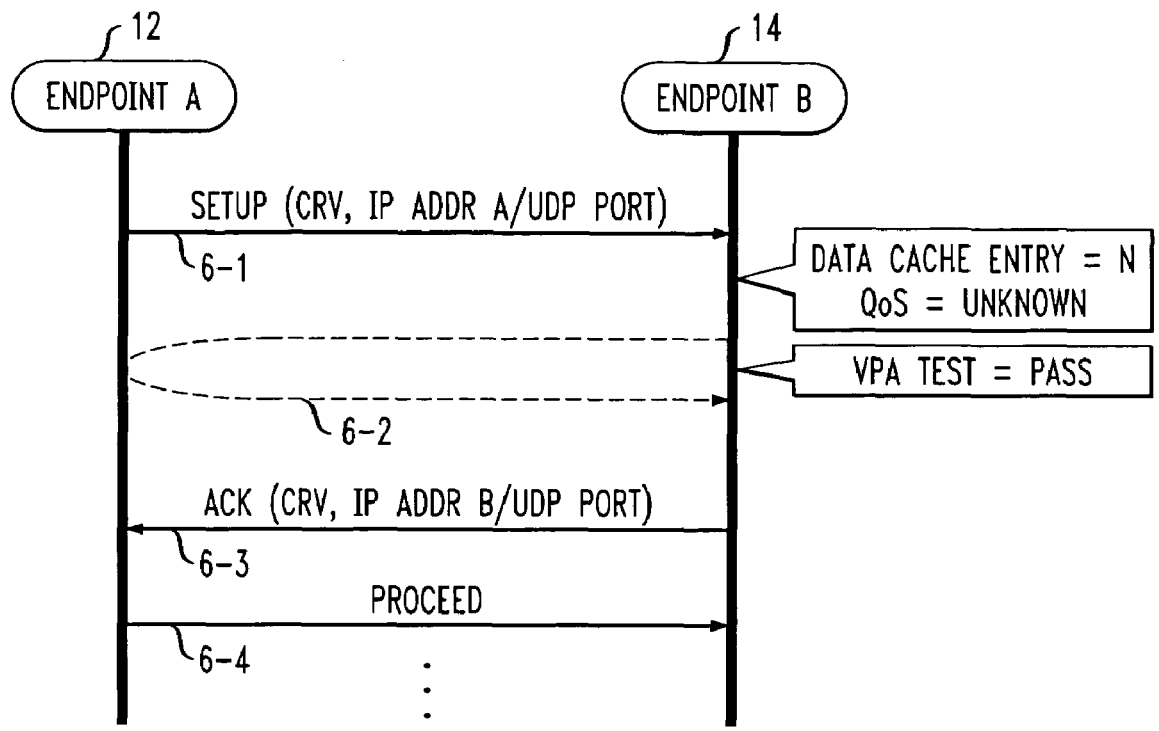
FIG. 6 is a call flow diagram illustrating another embodiment of the present invention.
Figure 7:
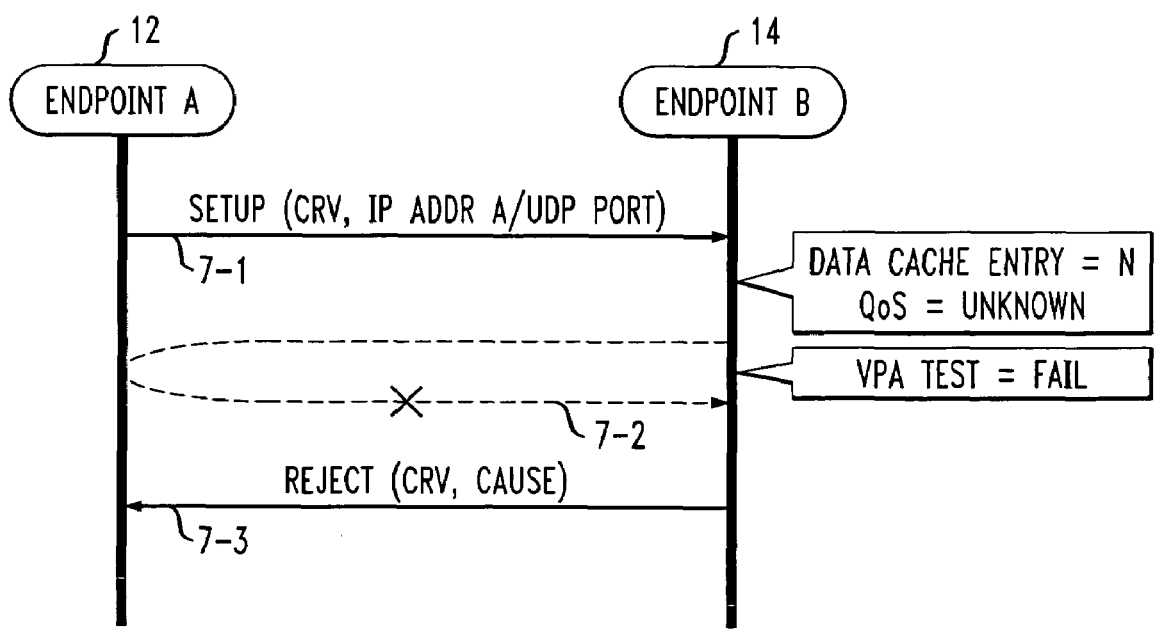
FIG. 7 is a call flow diagram illustrating another embodiment of the present invention.

As another and possibly alternative example, the endpoint 14 may be configured to run additional testing to gather further information on the reliability and quality of the requested logical connection. For example, a voice path assurance (VPA) test may be run. With reference to FIGS. 6 and 7, the process for running such a voice path assurance test is illustrated. As shown in FIG. 6, if a set-up message (typically including a call reference value (CRV) and the IP address and UDP port of the originating endpoint) is received at terminating endpoint B (14) (at 6-1), and the data cache entry is not located by the terminating endpoint B (14), it may be reasonably concluded that the quality of service for that path is unknown to the endpoint at that time. In that case, a VPA test may be run over the logical bearer connection (at 6-2). If the VPA test results in a PASS, an acknowledgement message is transmitted from terminating endpoint 14 to originating endpoint 12. This acknowledgement message typically will include a call reference value (CRV) and an IP address and UDP port number for the terminating endpoint 14. Call processing then proceeds as is typical (at 6-4).

Referring now to FIG. 7, another circumstance is illustrated. In this case, the terminating endpoint B receives a set-up message including a call reference value (CRV), and an IP address and UDP port for originating endpoint 12 (at 7-1). As with the scenario described in connection with FIG. 6, if no data cache entry is found (meaning that the quality of service level is unknown), then a VPA test may be run over the logical bearer connection (at 7-2). However, if the VPA test results in a FAIL, the call is rejected (at 7-3). Of course, the REJECT message will include a call reference value (CRV) and data indicating the cause of the rejection.

The voice path assurance test that is run by the terminating endpoint 14 may take a variety of suitable forms. However, a preferred voice path assurance testing technique to be implemented in connection with the presently disclosed embodiments is that disclosed in co-pending and commonly assigned U.S. patent application Ser. No. 10/856,495, entitled A METHOD AND APPARATUS FOR PROVIDING VOICE PATH ASSURANCE TESTING THROUGH A PACKET NETWORK, filed on May 28, 2004, and naming Steven L. Makowski, Douglas J. Botkin and Joseph J. Kott as inventors, which is incorporated herein by reference.

Briefly, the voice path assurance testing technique noted includes a number of exemplary implementations. It should be noted that the network elements (e.g. the originating and terminating endpoints) contemplated for implementation of these voice path assurance test techniques are configured to so implement the test. For example, the originating endpoints are preferably suited to selectively set up a loop-back condition for test packets (e.g. set up a test port) that may be sent by the terminating endpoint. The terminating endpoints are preferably configured to initiate the VPA test upon experiencing the noted conditions and are configured to carry out the techniques noted below.

In a first implementation, the voice path assurance test is implemented over the appropriate bearer path. First, the terminating endpoint 14 allocates a logical port for the connection from its available pool of logical ports. The terminating endpoint 14 then sends one or more test packets from the logical port it has allocated for the connection to the logical port it received in the connection set-up message from the originating endpoint 12. In this embodiment, the originating endpoint 12 provisions a test port for testing purposes. Thus, the test packets are simply looped back by the originating endpoint 12 to the terminating endpoint 14.

In another example of an implementation of the voice path assurance test contemplated, the terminating endpoint 14 allocates a logical port for connection from its available pool of logical ports. Then, the terminating endpoint 14 sends one or more test packets, from the logical port it has allocated for the call, to the logical port it received in the connection set-up message from the originating endpoint 12. The test packets sent by the terminating endpoint, in this embodiment, contain a unique payload identifier identifying the test packets as loopback packets. In this regard, the payload type indicator of the packet is appropriately modified. The test packets are thus looped back by the originating endpoint 12 to the terminating endpoint 14.

In a still further alternative in the voice path assurance testing technique, the terminating endpoint 14 allocates a logical port for the connection from its available pool of logical ports. The terminating endpoint 14 then sends one or more test packets to the originating endpoint. The test packet sent, in this embodiment, from terminating endpoint 14 contain the IP address sent by the originating endpoint in the connection set-up request and the "well known" UDP port number. Thus, the test packets are looped back by the originating endpoint to the terminating endpoint. This embodiment allows for the "well known" UDP port to provide a loopback function.

It should be understood that the test packets sent by the terminating endpoint 14 take a form that is well known. For example, the test packets contain a sequence number, as may be dictated by an appropriate protocol. The sequence number is used by the terminating endpoint 14 to determine if any test packets were lost. The test packet may also include standard fields such as payload type indicator and a destination port indicator. These fields may be appropriately modified according to the voice path assurance test selected. In addition, the test packet includes a local timestamp (indicating the local time of the terminating endpoint, for example) which is included within the payload of the test packet. While this is additional information that is not typically provided in the header of the test packet, the test packet format need not be changed because the local timestamp is simply included within the payload.

In addition, if the VPA test fails, the terminating endpoint 14 may take either of the following actions based on its internal provisioning. It may complete the connection set-up procedure and simply create an error report. Or, it may reject the connection set-up request and create an error report. When a connection request has been rejected by the terminating endpoint, the originating endpoint may try to alternately route the connection if an alternate route is available.

Referring back now to FIG. 5, an example implementation of the present invention is illustrated in block form. As shown, the system 500 includes the originating endpoint 12 and terminating endpoint 14. As shown, data packets are transmitted through a packet network 16.

Figure 5:
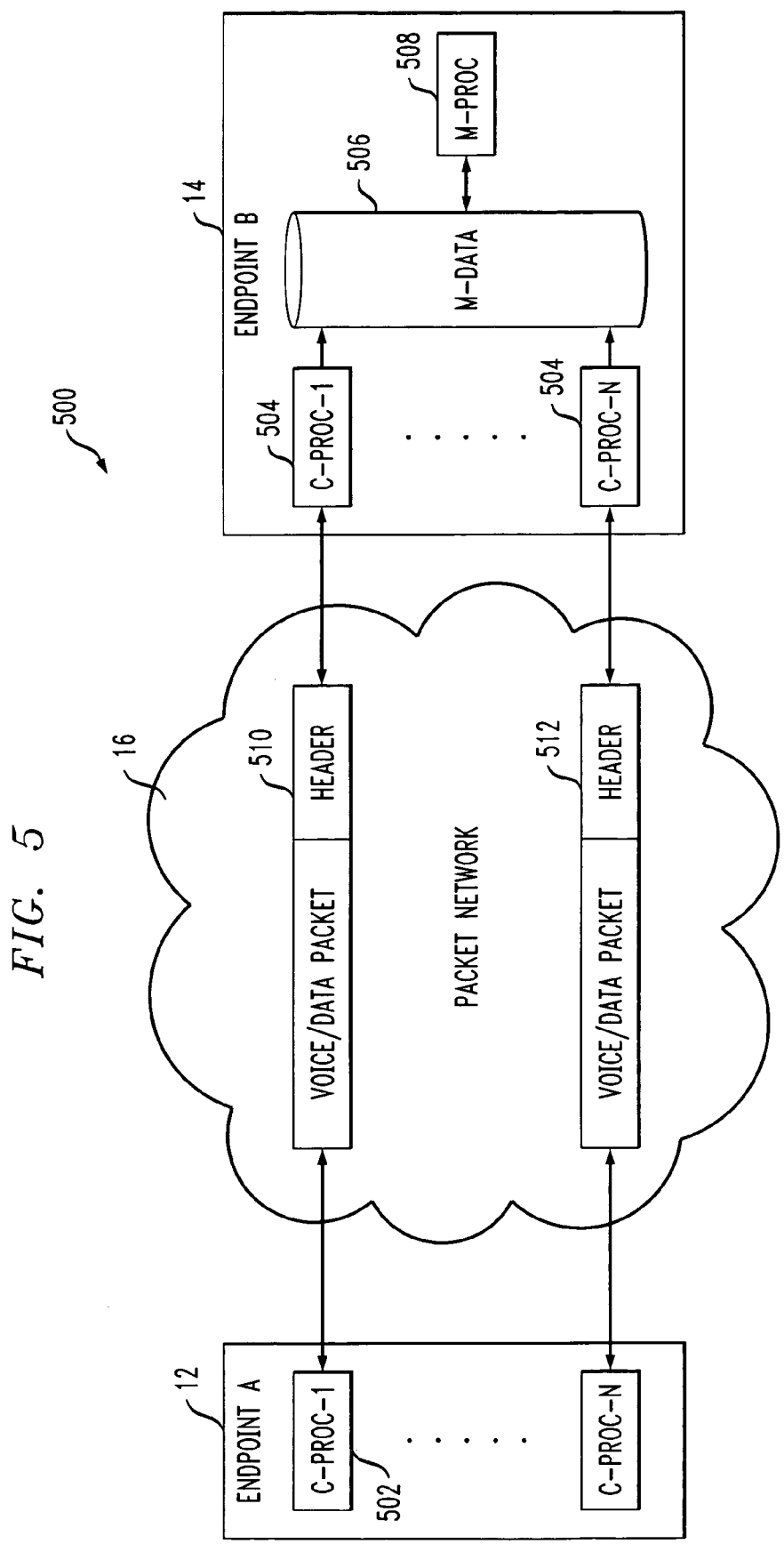
FIG. 5 is a block diagram illustrating an implementation of the present invention.

It should be understood that endpoint A includes call connection processing agent (C-Proc-1 through C-Proc-N) 502 and endpoint B includes call connection processing agent (C-Proc-1 through C-Proc-N) 504. As shown in the terminating endpoint, however, a database (M-Data) 506 is illustrated. The database, or data cache, 506 includes the quality of service data contemplated by the present invention. Also shown in the terminating endpoint is a maintenance processing agent (M-Proc) 508 which is utilized to maintain and build the data cache 506. FIG. 5 additionally illustrates packets 510 and 512 carried on active logical voice/data connections between the originating and terminating endpoints, both of which include appropriate headers and payload information. N logical connections are shown. A packet (such as packet 510 or packet 512) is only shown for two of the N active logical connections, although it should be understood that packets will exist for all N logical connections.

In operation, the terminating endpoint 14 monitors the quality of service on all incoming data streams from the originating endpoint 12. A quality of service score for all incoming data streams is aggregated in the data cache 506. The terminating endpoint 14 is configured to make decisions on whether to admit or deny a new logical connection from the originating endpoint using the aggregated score for the existing logical connections to the originating endpoint 12. Again, if no QoS data is available, the options outlined above may be pursued by the terminating endpoint.

It should be understood that the present invention may be implemented using a variety of hardware configurations and software techniques. The precise configurations and techniques may vary from implementation to implementation. As an example, however, it is to be appreciated that the methods described in connection with the present invention may be implemented in software that resides at the endpoints and may well be distributed throughout the system as is appropriate.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for call admission control through a communication system, the system comprising an originating endpoint in communication with a packet network and a terminating endpoint in communication with a packet network, the method comprising:
    sending a logical connection request by the originating endpoint to establish a logical connection;
    receiving a logical connection request by the terminating endpoint;
    determining whether quality of service data is stored for the logical connection, wherein the quality of service data comprises a quality of service indicator supporting at least two quality of service levels;
    accessing the quality of service data, if the quality of service data is stored, related to the logical connection;
    determining whether to accept or reject an incoming call on the logical connection based on the accessed quality of service data;
    acknowledging a logical connection request by the terminating endpoint if it is determined to accept the call;
    rejecting the logical connection request by the terminating endpoint if it is determined to reject the call; and,
    initiating a voice path assurance test, if supported, on the logical connection if no quality of service data is stored on the logical connection.

2. The method as set forth in claim 1 wherein the determining whether the quality of service data is stored comprises accessing a data cache.

3. The method as set forth in claim 1 wherein the quality of service data is based on quality of service metrics.

4. The method as set forth in claim 1 wherein the quality of service data is removed based on a timed threshold.

5. The method as set forth in claim 1 wherein the quality of service levels comprise at least acceptable and unacceptable.

6. A system useful for call admission control through a communication network, the system comprising:
    an originating endpoint in communication with a packet network, the originating endpoint being operative to send a logical connection request through the packet network to establish a logical connection; and,
    a terminating endpoint in communication with the packet network, the terminating endpoint being operative to receive the logical connection request, determine whether quality of service data is stored for the logical connection, wherein the quality of service data comprises a quality of service indicator supporting at least two quality of service levels, accessing the quality of service data, if the quality of service data is stored for the logical connection, determining whether to accept or reject an incoming call on the logical connection based on the accessed quality of service data, acknowledging a logical connection request by the terminating endpoint if it is determined to accept the call, rejecting a logical connection request by the terminating endpoint if it is determined to reject the call, and, initiating a voice oath assurance test, if supported, on the logical connection if no quality of service data is stored on the logical connection.

7. The system as set forth in claim 6 wherein the terminating endpoint is further operative to selectively initiate a voice path assurance test.

8. A computer readable medium having stored thereon a system useful for call admission control through a communication network, the system comprising:
    means for sending a logical connection request to establish a logical connection;
    means for receiving a logical connection request;
    means for determining whether quality of service data is stored for the logical connection, wherein the quality of service data comprises a quality of service indicator that supports at least two quality of service levels;
    means for accessing the quality of service data, if the quality of service data is stored, on the logical connection;
    means for determining whether to accept or reject an incoming call on the logical connection based on the quality of service data;
    means for acknowledging the logical connection request if it is determined to accept the call
    means for rejecting the logical connection request if it is determined to reject the call; and,
    means for beginning a voice path assurance test, if supported, on the logical connection if no quality of service data is stored on the logical connection.

9. The system as set forth in claim 8 further comprising a data cache having stored therein the quality of service data.

10. The system as set forth in claim 8 wherein the quality of service data is based on quality of service metrics.

11. The system as set forth in claim 10 wherein the quality of service data is removed based on a timed threshold.

12. The system as set forth in claim 8 wherein the quality of service levels comprise at least acceptable and unacceptable.

13. The system as set forth in claim 8 further comprising means for collecting quality of service data on incoming calls and means for calculating a single, aggregate quality of service indicator for each logical connection.

* * * * *

UNITED STATES PATENT AND TRADEMARK OFFICE
CERTIFICATE OF CORRECTION

PATENT NO. : 7,653,068 B2 Page 1 of 1
APPLICATION NO. : 10/864583
DATED : January 26, 2010
INVENTOR(S) : Botkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1550 days.

Signed and Sealed this

Twenty-eighth Day of December, 2010

David J. Kappos
*Director of the United States Patent and Trademark Office*